United States Patent [19]
Yamamoto

[11] Patent Number: 4,594,764
[45] Date of Patent: Jun. 17, 1986

[54] PARTS ASSEMBLING METHOD AND SYSTEM

[75] Inventor: Haruo Yamamoto, Yokosuka, Japan

[73] Assignee: Nissan Motor Co., Ltd., Yokohama, Japan

[21] Appl. No.: 646,057

[22] Filed: Aug. 31, 1984

[30] Foreign Application Priority Data

Sep. 13, 1983 [JP] Japan .................................. 58-167409

[51] Int. Cl.⁴ ........................ B21D 39/00; B23Q 7/00; B23P 19/00
[52] U.S. Cl. ..................................... 29/430; 29/33 K; 29/33 P; 29/559; 29/712; 29/791; 29/824; 198/339.1; 901/7
[58] Field of Search ................ 29/33 K, 430, 559, 700, 29/709, 711, 712, 791, 822, 823, 824, 33 P; 198/339, 472, 487, 488, 773, 774; 414/222; 901/7, 50

[56] References Cited

U.S. PATENT DOCUMENTS

| | | | |
|---|---|---|---|
| 1,750,130 | 3/1930 | Romine | 29/430 |
| 4,411,354 | 10/1983 | Thibault et al. | 29/430 X |
| 4,442,335 | 4/1984 | Rossi | 901/50 X |
| 4,464,833 | 8/1984 | Duncan | 29/709 X |

*Primary Examiner*—Mark Rosenbaum
*Assistant Examiner*—Ronald S. Wallace
*Attorney, Agent, or Firm*—Schwartz, Jeffery, Schwaab, Mack, Blumenthal & Evans

[57] ABSTRACT

A parts assembly method and a device which utilizes this method, in which the structure for receiving parts member for assembly is set in prescribed attitudes, and the parts are automatically assembled in that member by assembly from a fixed direction, so that an automatic device having simple movements can be mainly used. The structure member being assembled can be set in an optional direction in which conditions are more suitable for the assembly. There is no increase in cost, and the parts are reliably and automatically assembled into the receiving member.

17 Claims, 40 Drawing Figures

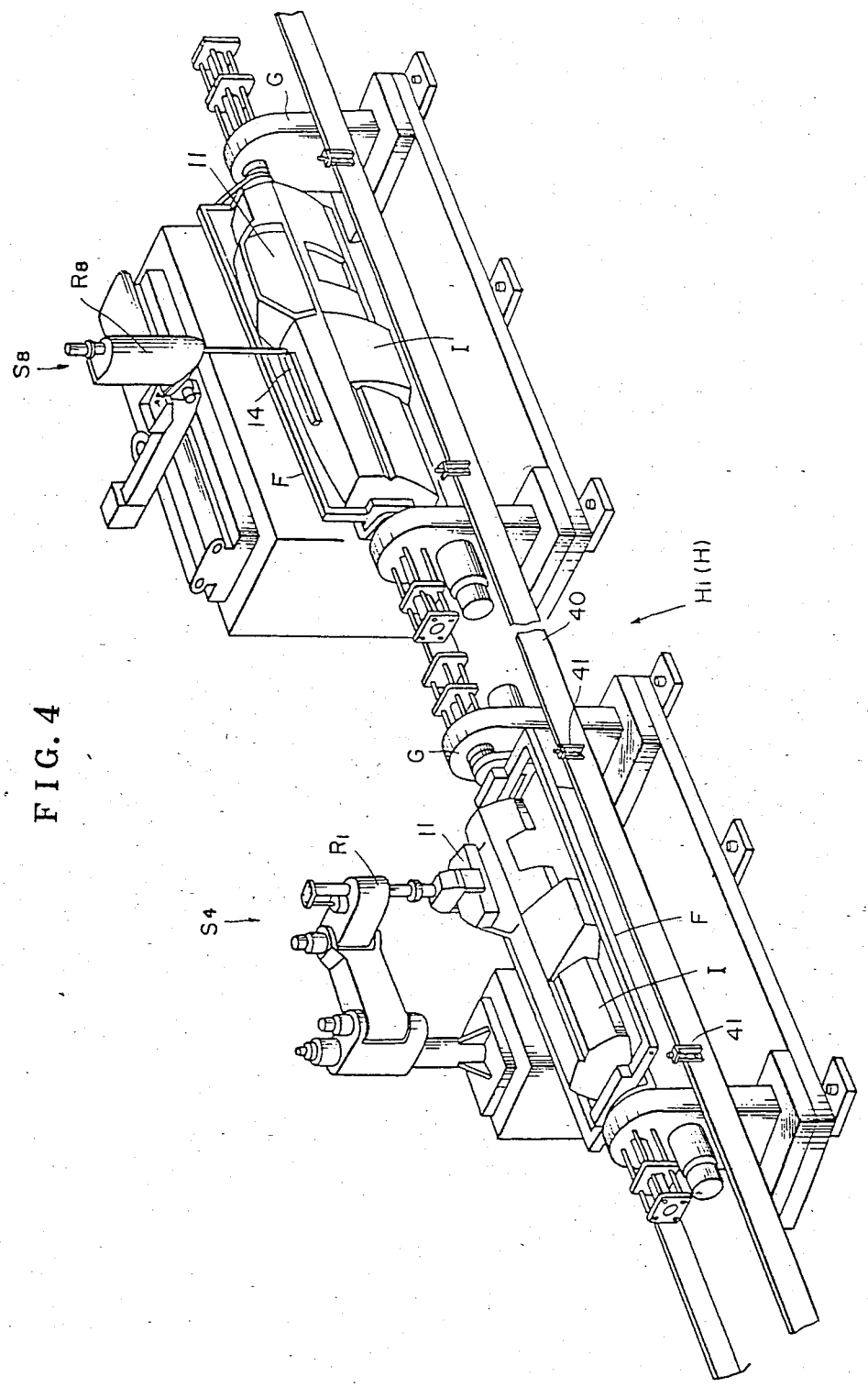

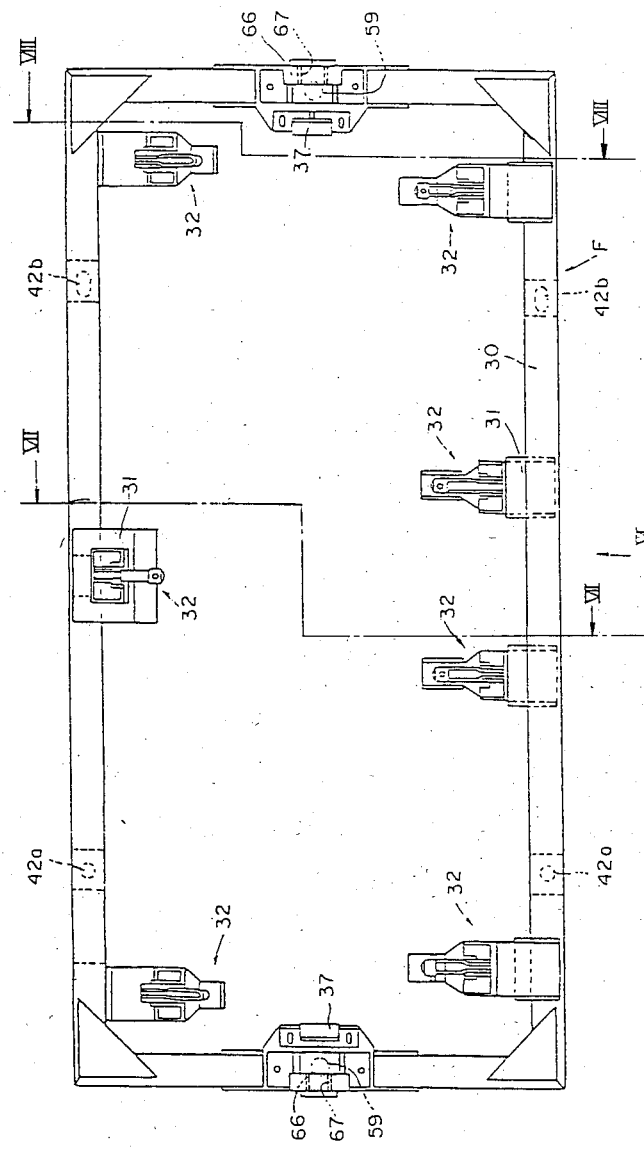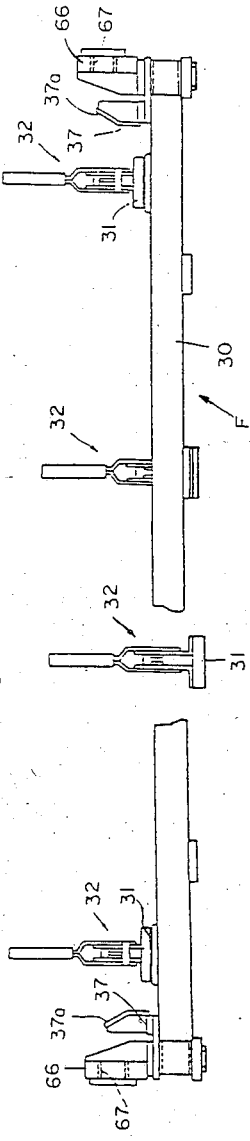

PARTS ASSEMBLING METHOD AND SYSTEM

BACKGROUND OF THE INVENTION

1. Field of the Invention

The present invention relates to a parts assembly method and the equipment to carry out the method, for assembling parts or components such as instrument parts in a structure member such as an instrument panel, and especially a parts assembly method and device which is able to automatically assemble the parts or components in a reliable manner.

2. Description of the Prior Art

Usually, in an assembly line such as those for automobiles, the instrument to be assembled in an automobile is made up by assembling various kinds of parts or components in an instrument panel used as a receiving member or structure member. A production line system is usually adopted for making up these instruments in consideration of its effective operation. In this type of conventional parts assembly method, the instrument panel is set in a fixed position in a fixture mounted on a conveyor, and the instrument panel is transported by means of the conveyor to an assembly stage. Then, each part is assembled in sequence, by manual operation, into the transported instrument panel at the assembly stage.

This method of assembly, using manual labor, is very inefficient, and consequently the need for automatic assembly has become very pronounced.

Accordingly, automatic equipment such as robots is provided for conventional parts assembly devices at each stage of the assembly, and these robots carry out the parts assembly operation through teaching data prepared in advance.

However, in this type of conventional parts assembly method, the instrument panel having a plurality of mounting portions for receiving parts or components is maintained in a fixed attitude on the conveyor to transport it. For this reason, the mounting portions provided for receiving the parts or components in the instrument panel face in different directions. In this case, when the parts or components are inserted into or mounted to the mounting portions in the instrument panel, their access direction must correspond to the direction in which each mounting portion faces. For this reason, it is necessary to have many multishaft robots which are capable of complicated movements to assemble such parts. Therefore, the cost of the parts assembly device itself becomes very large, and depending on the assembly direction, poor assembly can result from displacement of the part or component caused when screws are being tightened to secure the part or component in place. In addition, it could become impossible to carry out assembly, as a result of problems with the shape of the instrument panel and the space available when the parts or components are inserted and the screws tightened, if interference develops between the instrument panel and the robot arm or the screw tightening device.

SUMMARY OF THE INVENTION

The object of the present invention is to provide a parts assembly method and device with which it is possible to automatically mount parts or components to a structure member in an assembly with high reliability.

Another object of the present invention is to provide a parts assembly method and device with which it is possible to use many automatic machines or devices which have simple movements.

A further object of the present invention is to provide a parts assembly method and device with which it is possible to set the structure member in a convenient direction in which assembly conditions are good for the structure member to receive its parts or components.

Briefly described, these and other objects of the present invention are accomplished by the provision of an improved automatic parts assembly apparatus which includes a securing jig which removably supports a structure member for assembly; a transportation device for transporting the structure member and the securing jig to the parts assembly stage; a setting jig which is provided on the parts assembly stage for positioning the abovementioned securing jig and setting the structure member in the prescribed attitude; and an automatic device which is provided on the assembly stage for mounting the parts from a prescribed direction into the structure member. In the parts assembly device, the structure member for assembly is previously secured by means of the securing jig, and the structure member for assembly is transported together with the securing jig to the parts assembly stage. Subsequently the securing jig is set in a fixed position in the setting jig, and, using the setting jig, the mounting portions or openings of the structure member for receiving the parts or components are set in a fixed direction, and the parts or components are assembled into the structure member.

The parts or components are automatically assembled from a fixed direction so that an automatic device having simple movements can be mainly used. In addition, the structure member being assembled can be set in an optional direction in which conditions are more suitable for the assembly. Costs are not increased and the parts or components are reliably and automatically assembled into the receiving member.

BRIEF DESCRIPTION OF THE DRAWINGS

These and other objects, features, and advantages of the present invention will be more apparent from the following description of a preferred embodiment, taken in conjunction with the accompanying drawings, in which:

FIG. 4 is a perspective view of the essential portion of the embodiment in FIG. 3.

FIG. 5 is a plan view showing one embodiment of the securing jig.

FIG. 6 is a partially broken end view of the embodiment of FIG. 5, viewed in the direction of the arrow VI.

FIGS. 15A and 15B to FIGS. 24A and 24B are exploded perspective views and schematic sectional views showing the assembly status of each part or component respectively.

DESCRIPTION OF THE PREFERRED EMBODIMENTS

Figure 1:
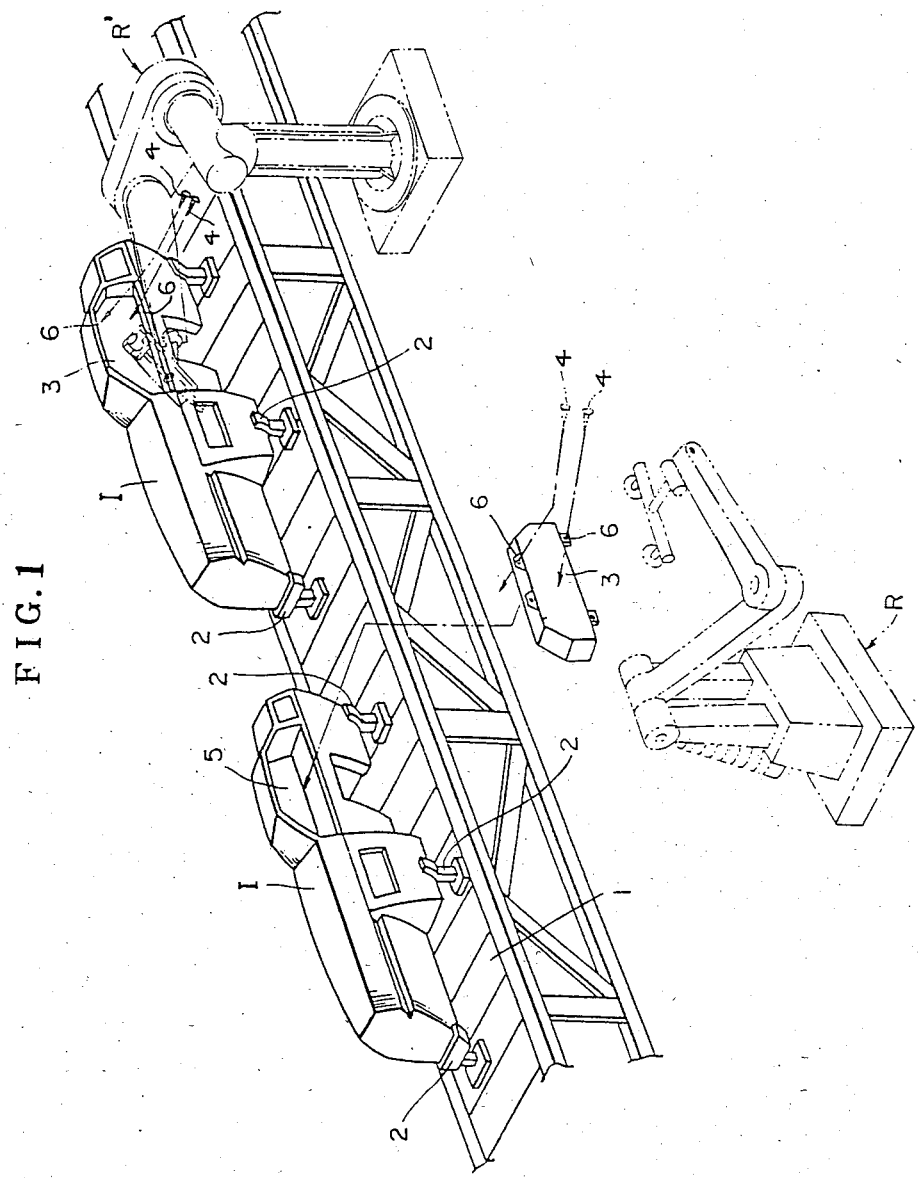
FIG. 1 is a perspective, explanatory view of the essential portions in one example of a conventional assembly device for parts or components.

To facilitate the understanding of the present invention, a brief reference will be made to a prior art head access mechanism illustrated in FIG. 1.

As shown in the drawings, in the prior art parts assembly mechanism, there is a conveyor 1, and there are fixtures 2 which position an instrument panel I in a fixed position on the conveyor 1, and, the instrument panel I secured in a fixed position on the conveyor 1 is transported to an assembling stage. Provided on each assembling stage are robots R, R', which assemble each of the parts or components representatively designated by reference numeral 3 and 4.

In the parts assembling mechanism having the configuration outlined above, the instrument panel I which is being transported on conveyor 1 is maintained in a fixed attitude, so that mounting portions on the instrument panel I, representatively designated by reference numeral 5 and 6 for the parts are open in various directions. Therefore, the conventional device, as previously outlined, requires a multishaft robot, so that problems such as poor parts assembly can develop.

The present invention has been successful in eliminating such problems and will now be described with reference to FIG. 2 to FIGS. 24A and 24B.

In describing a parts assembly device which is an embodiment of the present invention, we will first explain the parts or components to be assembled in an instrument panel and the assembly line.

Figure 2:
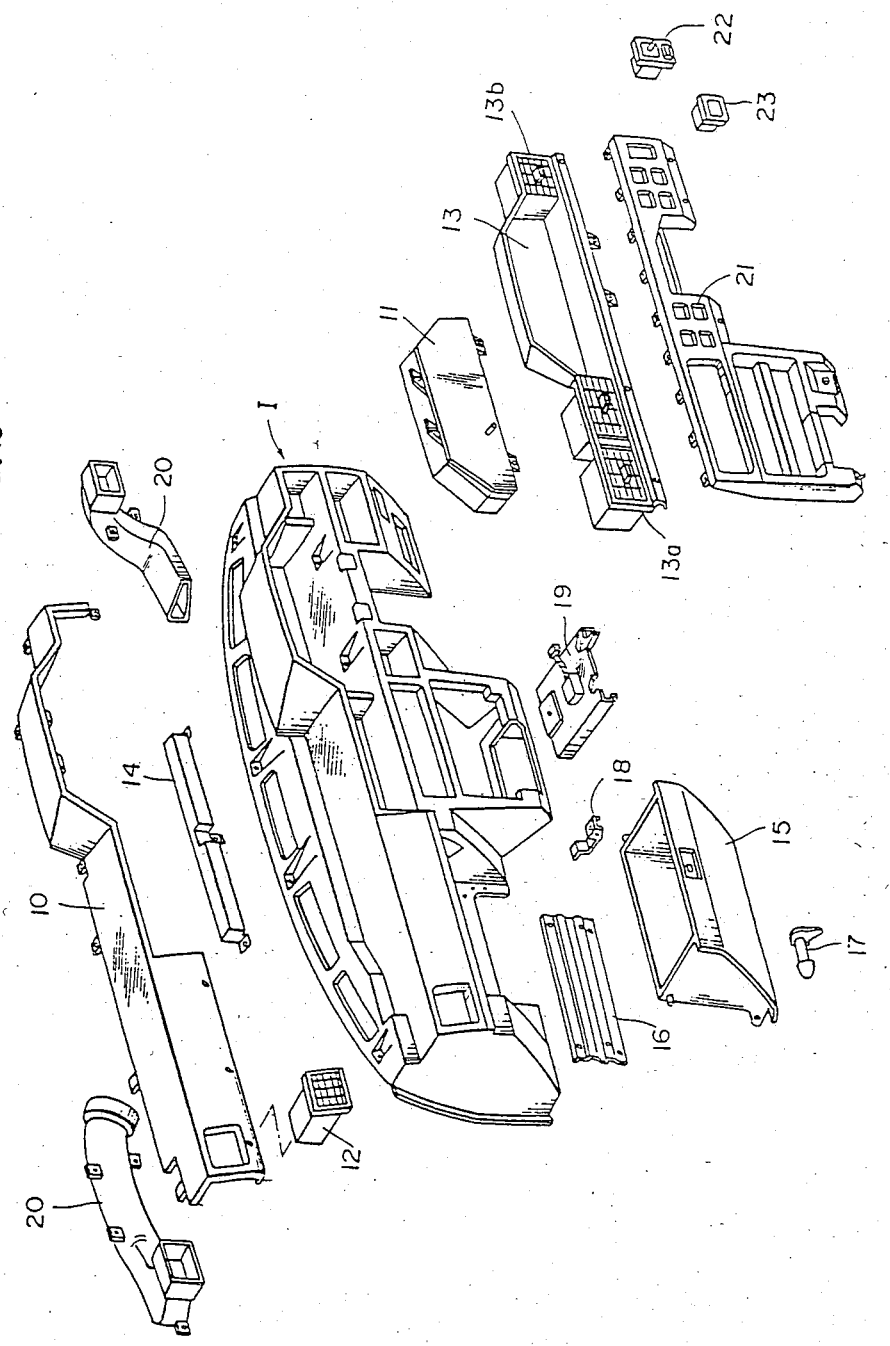
FIG. 2 is an exploded perspective view showing each part or component to be mounted to an instrument panel.

Referring to FIG. 2, here, all the parts or components which are assembled in the instrument panel are shown.

As parts or components to be assembled in an instrument panel I having a plurality of openings such as a grill opening Ia, there are provided an instrument pad 10 which connects to the instrument panel and covers the upper surface of the panel and one part of the side surface inside an automobile compartment; a combination meter 11 in which are included all types of instruments, such as the speedometer, etc.; a side ventilator 12 which is inserted into and supported by the grill opening Ia and an opening 10a of the instrument pad 10 which corresponds with the grill opening Ia; a first cluster lid 13 which covers the perimeter of the combination meter 11 and have a center ventilator 13a and a side ventilator 13b built therein; instrument lamps 14 installed in the edge portion of the top surface front window panel of the instrument panel I; a glove box 15; a reinforcing member 16 for supporting the glove box 15; a hinge pin 17 which supports the glove box 15 and makes its rotation possible; a locking striker 18 with which a latch (not shown) provided in the glove box 15 engages and disengages; an ash tray outer panel 19 which supports an ash tray; two side ventilator ducts 20 which connect to the left and right side ventilators 12, 13b respectively; a second cluster lid 21 which connects to the bottom side of the first cluster lid 13; and switch parts 22,23 for a mirror control switch and a rear defogger mounted in the second cluster lid 21.

Figure 3:
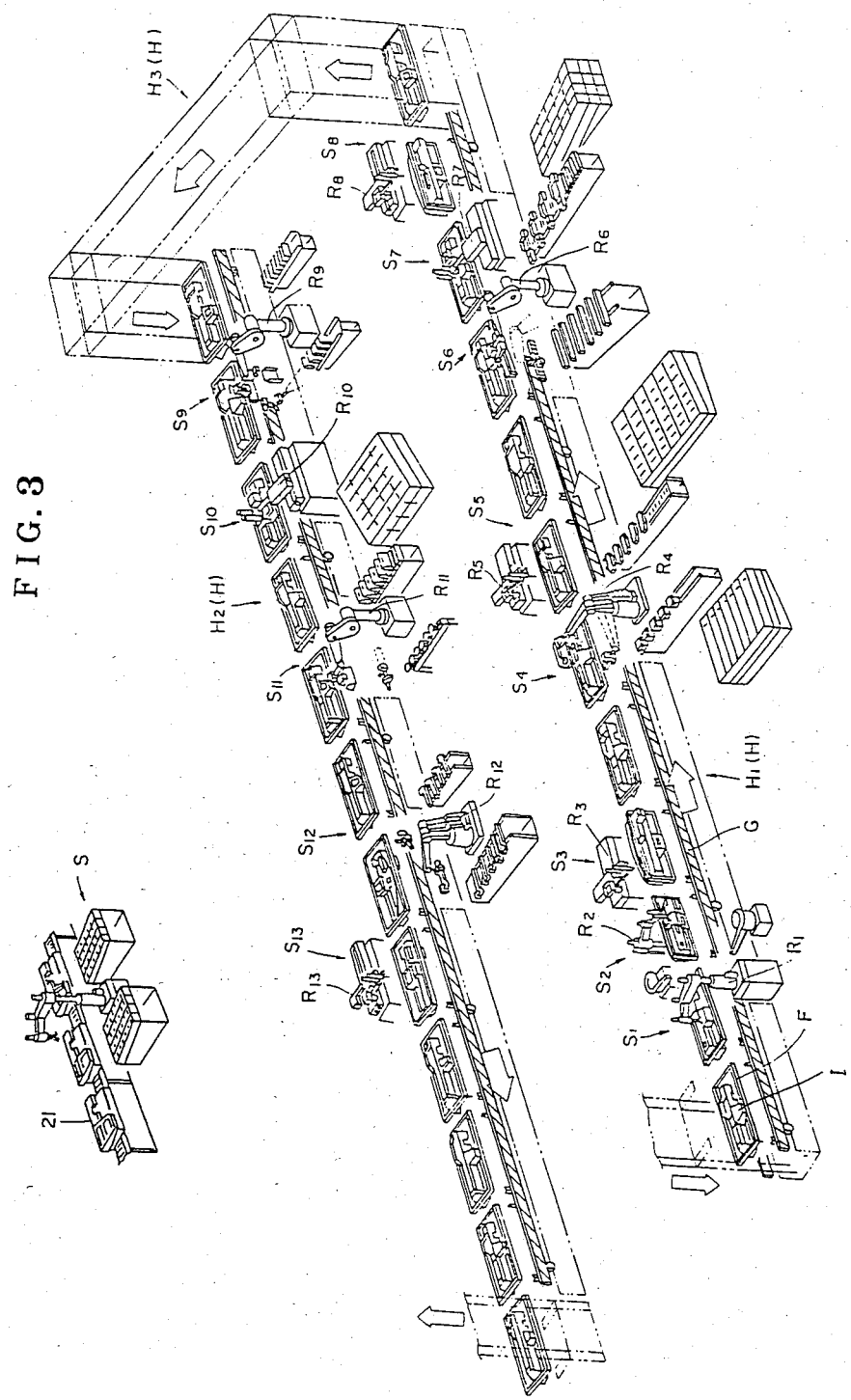
FIG. 3 is a perspective view generally showing one embodiment of the parts assembly device according to the present invention.
Figure 7:
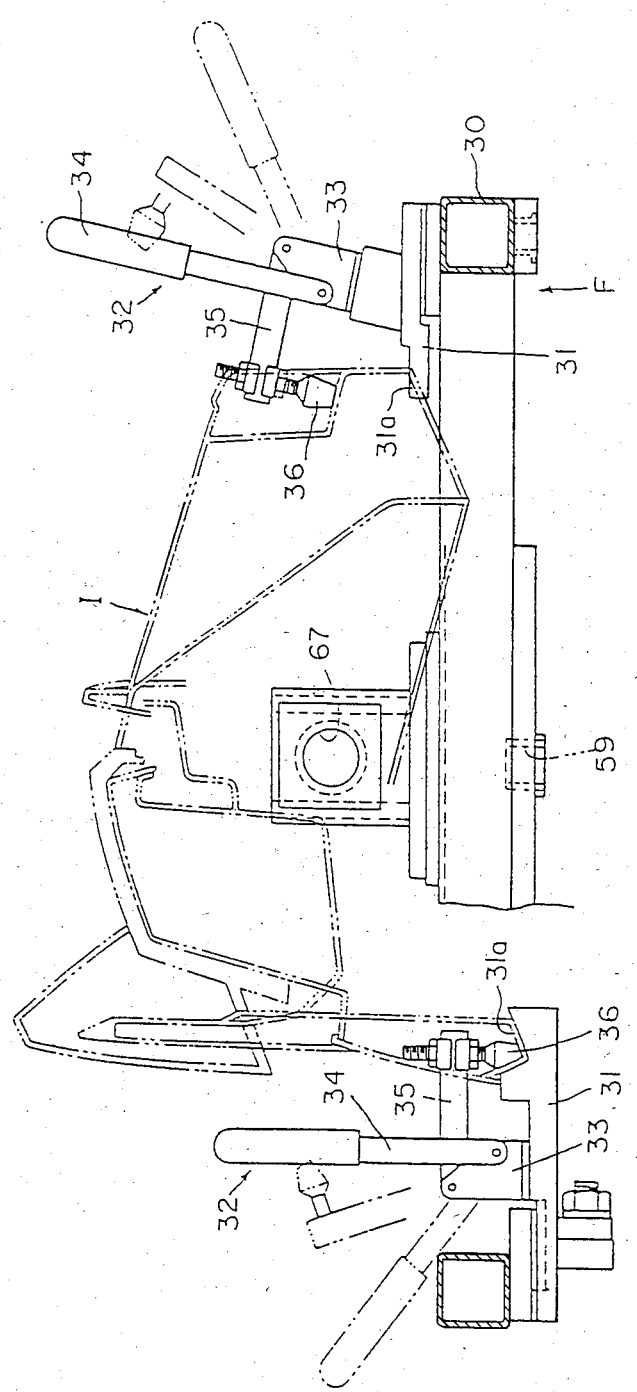
FIG. 7 and FIG. 8 are partially broken cross-sectional views taken along the lines VII—VII and VIII—VIII of FIG. 5.
Figure 8:
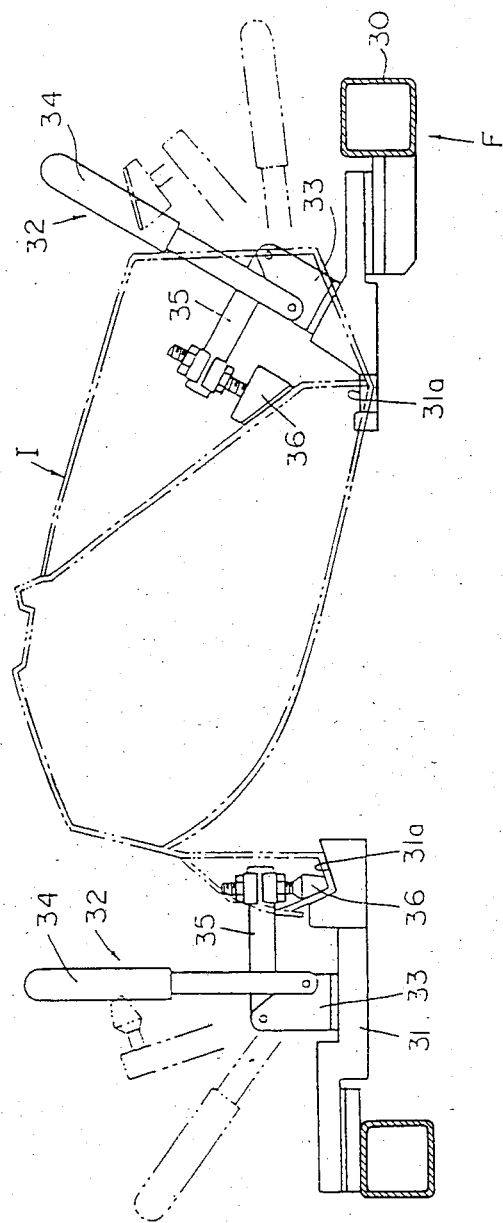

Referring to FIG. 3, this drawing illustrates one example of an assembly line for assembly of the instruments in the instrument panel I. This line is made up of, for example, thirteen assembly stages. In first and second assembly stages S1 and S2, expansion nuts (not shown) are mounted on the instrument panel I so as to form the threaded section for screws. At a third assembly stage S3, the tightening of the screws in the instrument panel 10 is carried out, and at a fourth assembly stage S4, along with the temporary assembly of the combination meter 11, the side ventilator 12 is mounted. At a fifth assembly stage S5, the tightening of the screws of the combination meter 11 is carried out, and at a sixth assembly stage S6, the temporary assembly of the first cluster lid 13 and the instrument lamps 14 takes place, while at seventh and eighth assembly stages S7 and S8 the tightening of the screws of the first cluster lid 13 and the instrument lamps 14 is carried out. At a ninth assembly stage S9, the reinforcing member 16 for supporting the glove box 15, the striker 18 for the lock of the glove box 15, and the ash tray outer panel 19 are temporarily mounted, and at a tenth assembly stage S10, the tightening of the screws of all the parts or components which were temporarily mounted at the ninth assembly stage S9 is carried out. The glove box 15 and the hinge pin 17 of the glove box 15 are mounted at a eleventh assembly stage S11. The side ventilator duct 20 is temporarily mounted at a twelfth assembly stage S12, and the tightening of the screws in the side ventilator duct 20 is carried out at a thirteenth assembly stage S13. Furthermore, the mirror control switch 22 and the switch parts 23 are assembled in a second cluster lid 21 on a subline S', and then this second cluster lid 21 is assembled into the instrument panel I.

Referring to FIGS. 3 and 4, these drawings illustrate an embodiment of a parts assembly device according to the present invention applied to an assembly line as outlined above. This parts assembly apparatus comprises a securing jig F which removably secures the instrument panel I on a transportation apparatus H which transports the instrument panel I together with the jig F to parts assembly stages S1 to S13; a setting jig G provided on the parts assembly stages S1 to S13 to position the securing jig F so as to set the instrument panel I in a prescribed attitude; and robots R1 to R13. Each of these parts or components is assembled, from a prescribed direction, into the instrument panel I by means of automatic machines such as the parts assembling robots R1 to R13.

The securing jig F, as shown in FIG. 4 to FIG. 8, comprises a rectangular frame 30 surrounding the instrument panel I, and a plurality of support plates 31 are installed to the frame 30 facing the inside of the frame 30. In addition, provided on each support plate is a receiving section 31a which is formed to correspond with the shape of each part of the instrument panel I to support the instrument panel I. Also provided on the support plates 31 are clampers 32 each comprising a mounting base 33 secured in the support plate 31, an operating lever 34 supported in a rotatable manner on the mounting base 33, and a pivoting arm 35 pivotally supported on the mounting base 33 and joined through toggles to the operating lever 34 so as to rotate following the lever 34. Furthermore this pivoting arm 35 has a press means 36 mounted on a freely rotatable tip of the pivoting arm 35 so as to retain the instrument panel I between the receiving section 31a and the press means 36. By means of the pivoting action of the operating lever 34 up to the clamp position, the rotating arm 35 is restrained at the clamp position, and the instrument panel I is retained by the press means 36. Also, on the receiving section 31a of the support plate 31 which is positioned in the center of either longitudinal side of the frame 30, a positioning hole is opened (not shown on the drawings). A positioning projection (not shown) provided in the center of the longitudinal side of the instrument panel is inserted into this positioning hole. At the same time, on either transverse side of the frame 30, a positioning leaf 37 is provided which positions the transverse side section of the instrument panel I. A guide section 37a which expands in the outward direction is formed on this positioning leaf 37. This guide section 37a moves as a guide when the instrument panel I is placed between the positioning leaves 37. Furthermore, the movement of the clamper 32 may be activated by means of a cylinder, or in a like manner.

The transporting mechanism H can be made up of a lift and carry type conveyor as is shown in FIG. 3 and FIG. 4. Specifically, the transporting mechanism H comprises a first transportation section H1 which is made up of a pair of shuttle bars 40 placed so that they traverse the parts assembly stages S1 to S8; a second transportation section H2 which is made up of a pair of shuttle bars 40 placed so that they traverse the parts assembly stages S9 to S13; and a transfer section H3 which transfers the instrument panel and securing jig assembly from the first transportation section H1 to the second transportation section H2 in sequence. On the pair of shuttle bars 40, a pair of fixtures 41 are provided on each stage in the longitudinal direction of the shuttle bars 40, such that the fixtures engage with and removed from the securing jig F comprising both longitudinal sides of the frame 30 as shown in FIG. 5, specifically through mating holes 42a and 42b provided corresponding to the fixtures 41. It will be noted in the drawing that the mating hole 42b is formed as a long hole to compensate for the pitch aberration between the mating holes 42a and 42b.

Figure 9:
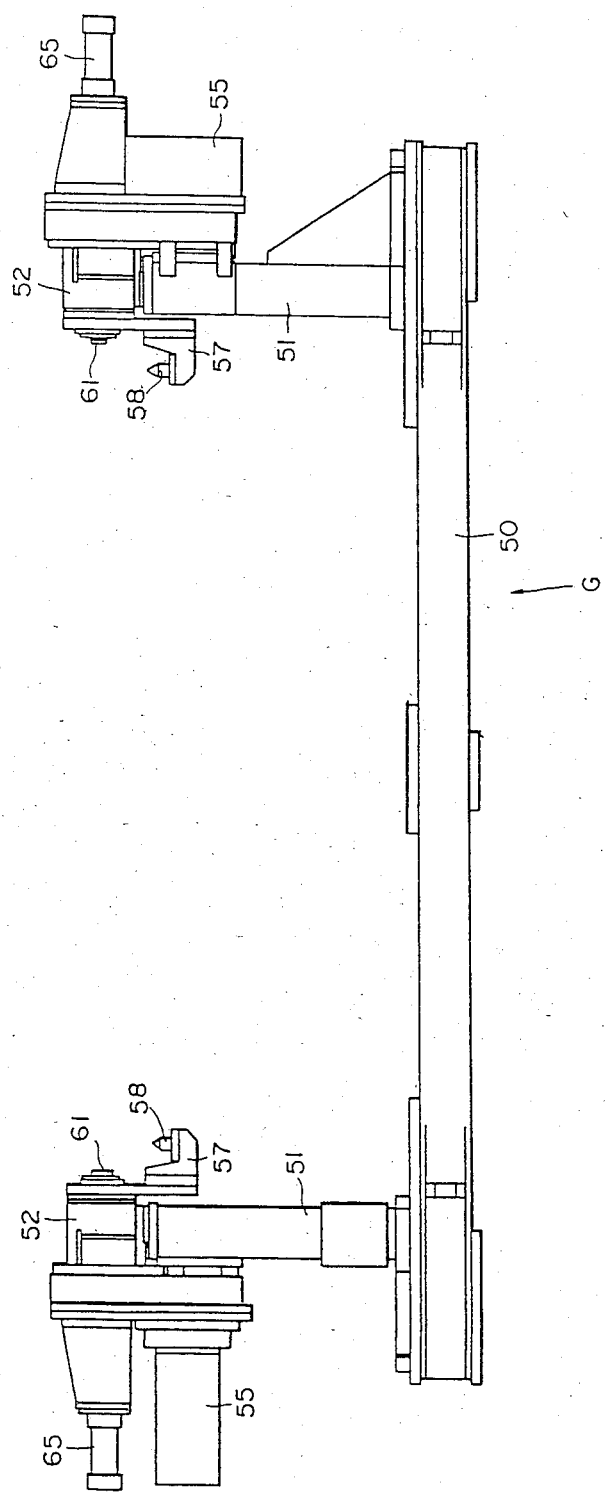
FIG. 9 is a front elevational view of one example of a setting jig.
Figure 10:
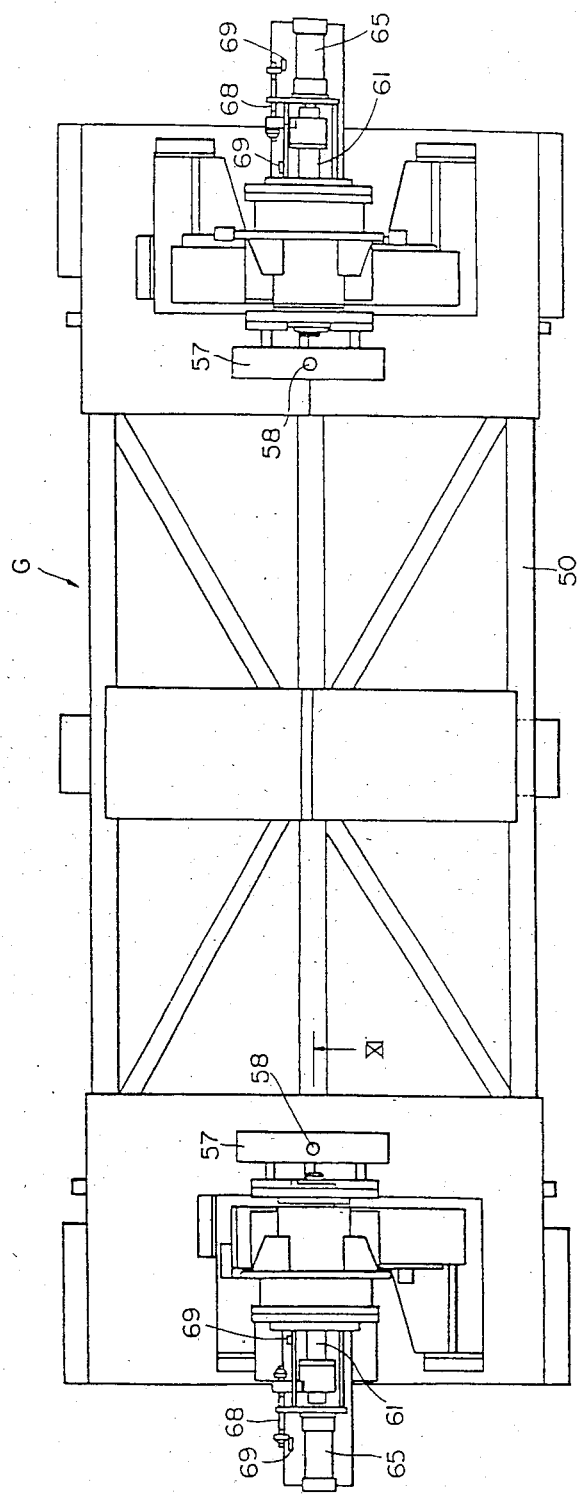
FIG. 10 is a plan view of the setting jig of FIG. 9.
Figure 11:
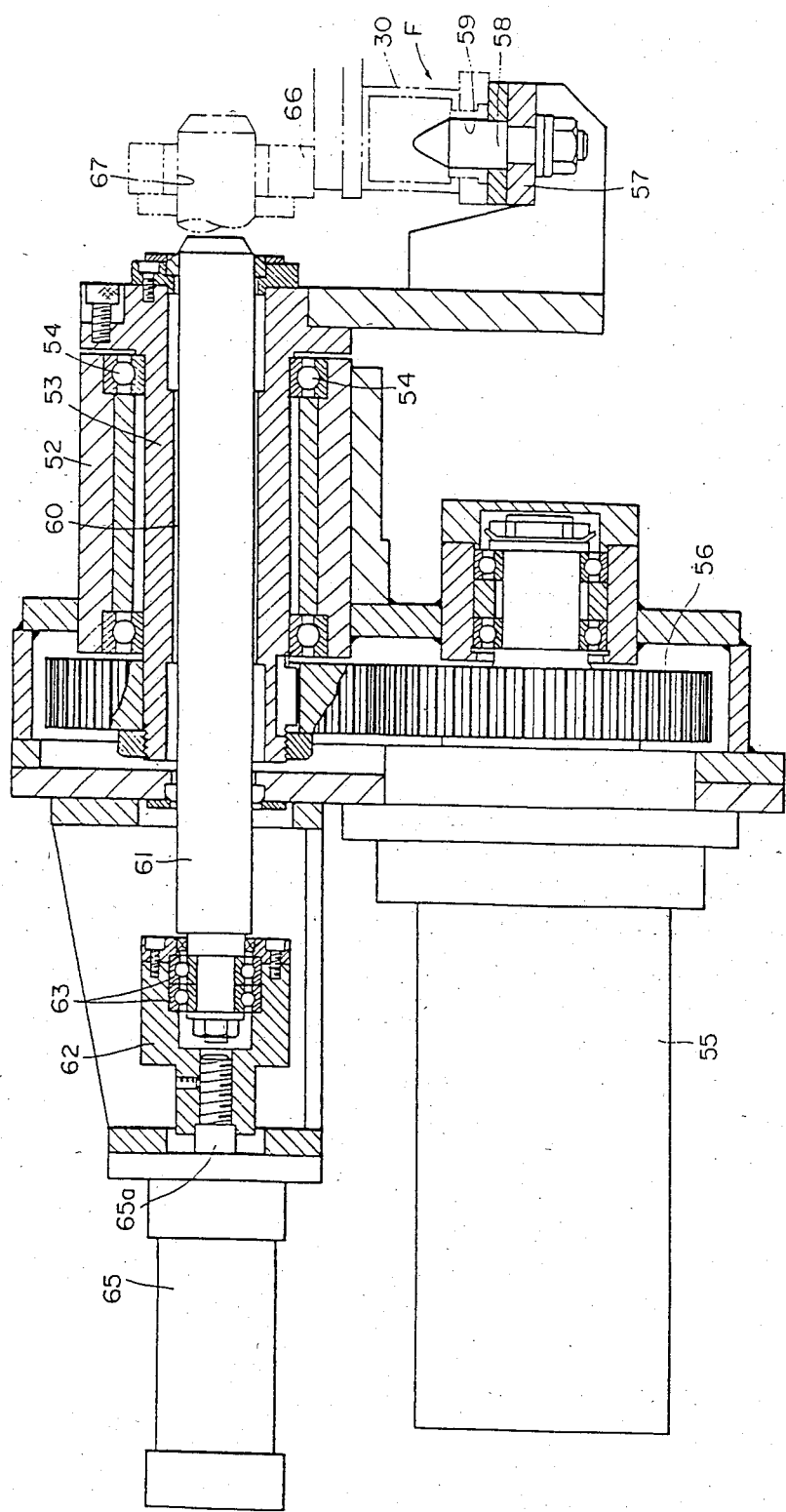
FIG. 11 is a partial cross-sectional view taken along the line XI—XI in FIG. 10.

The setting jig G, as shown in FIG. 4 and in FIG. 9 to FIG. 11, has a pair of vertical supporting struts 51 each extending from a stand 50 at the center of the transverse side member thereof. A rotating member 53 is provided in a casing 52 set in the upper section of each of the supporting struts 51. The rotating member 53 turns with a shaft which is extended in the longitudinal direction of the instrument panel and securing jig assembly as the rotational center. Rotation is provided from a pulse motor 55 mounted on the casing 52 through a gear mechanism 56, and the rotating member 53 is pivotally supported through bearing 54 in the casing 52. A substantially L-shaped bearing plate 57 which supports the securing jig F projects outward so as to oppose the similar bearing plate of the rotating member 53 of the opposite strut. On the horizontal surface of this bearing plate 57, a positioning pin 58 also protrudes outward. The positioning pin 58 is inserted into a positioning hole 59 which is established in the center of each transverse side member of the frame 30. In addition, a hole section 60 is formed axially through the rotating member 53. A movable, positioning shaft 61 is provided to extend through this hole section 60 and the hole section 52a in the casing 52. The base end section of this positioning shaft 61 is connected to a fixed supporting member 62 through a bearing 63. The fixed supporting member 62 is securely connected to a piston rod 65a on an air cylinder 65 which is mounted by means of a bracket 64 on the casing 52. The positioning shaft 61 moves in a reciprocal manner as a result of the reciprocal motion of the piston rod 65a of the air cylinder 65, and, when the positioning shaft 61 advances, it extends outward from the opposite end opening of the rotating member 53. The advanced positioning shaft 61 is inserted into a positioning hole 67 in a protruding leaf 66 erected in the center of each transverse side member of the frame 30. In the assembly stages other than the assembly stages S1 to S13, the instrument panel and securing jig assembly is temporarily placed on a platform. In addition, as shown in FIG. 10, a striker 68 which vertifies the reciprocal action of the positioning shaft accompanying the reciprocal action of the positioning shaft 61 is provided together with a detection element 69, which could be, for example, a limit switch which is arranged to act corresponding to the advancing position or the retreating position of the striker 68 when a prescribed position is reached by the striker 68.

Figure 12:
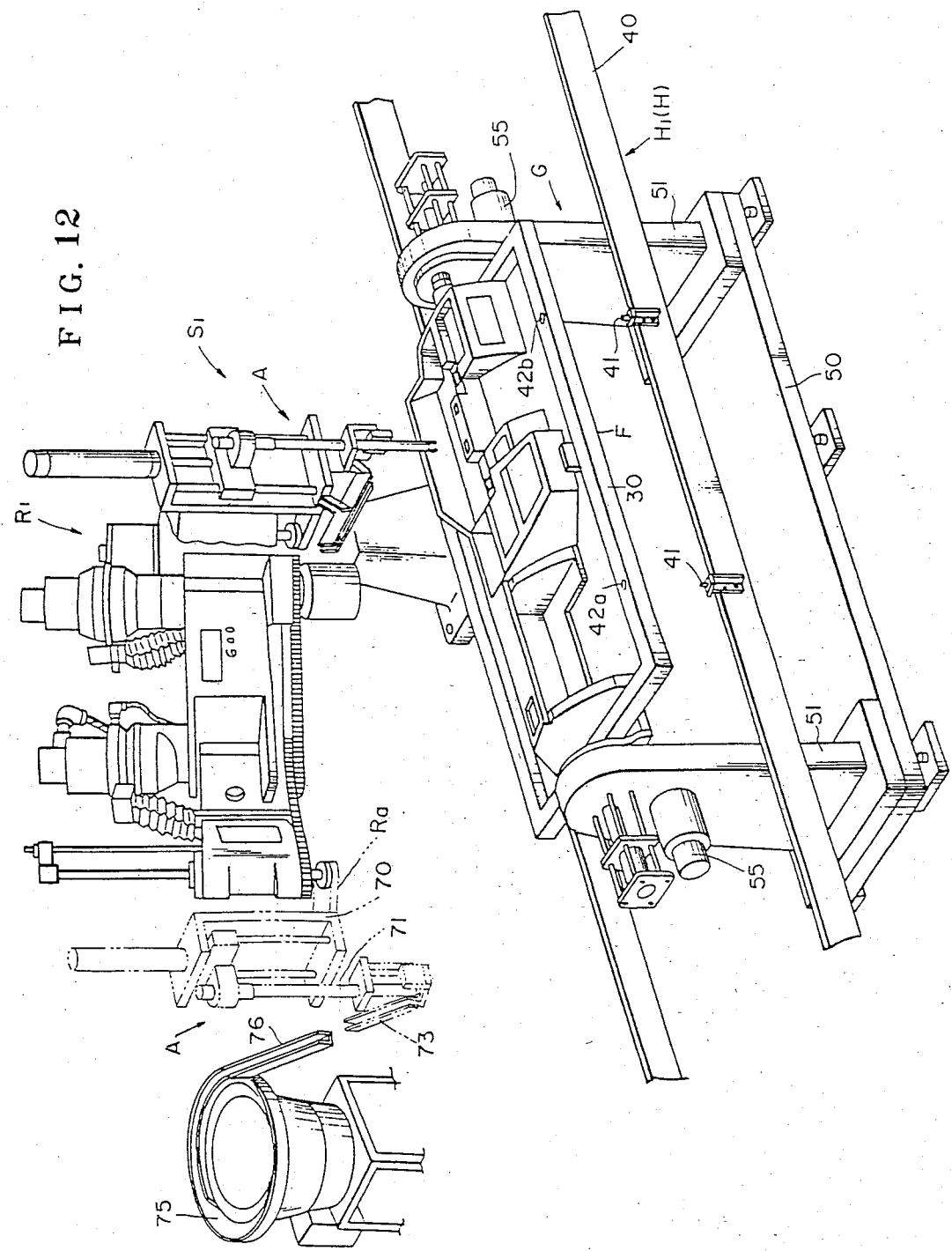
FIG. 12 is a perspective view showing one example of a parts assembly robot.
Figure 13:
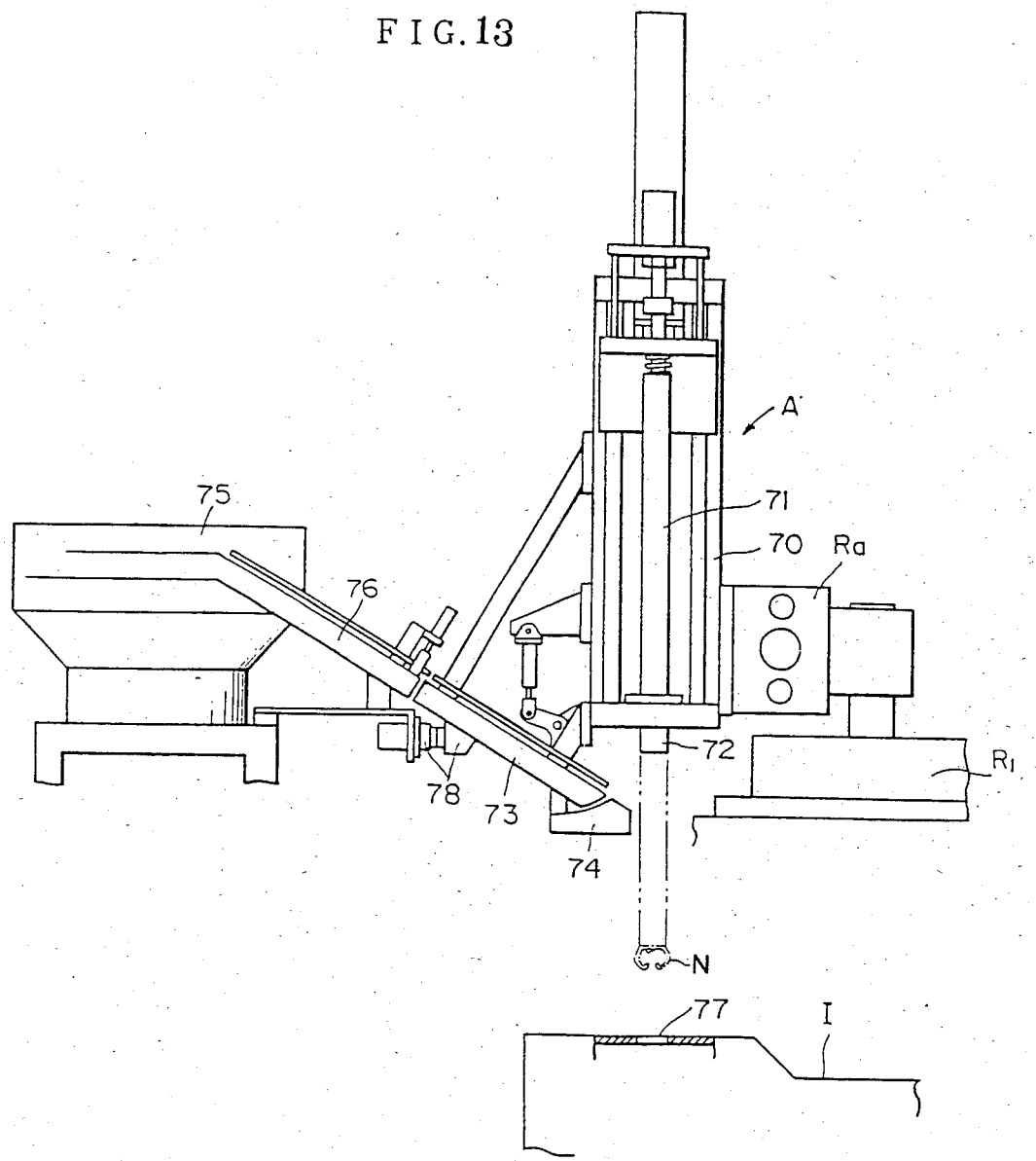
FIG. 13 is a schematic view illustrating the operation of the robot shown in FIG. 12.

Also, the parts assembly robots R1 to R13, as shown in FIG. 3, are equipped with necessary devices or hands for assembling the parts in the instrument panel I. By means of prescribed teaching actions, at the mounting position of the instrument panel I, the parts are mounted from above respectively. For example, as shown in FIG. 12 and FIG. 13, at the first assembly stage S1, a double-shafted arm Ra is provided in the parts assembly robot R1 to move in the horizontal direction. An expansion nut driving mechanism A is provided in the arm Ra. The driving mechanism A has a base member 70 secured in the arm Ra, a driving member 71 mounted so that reciprocal action is possible in the vertical direction opposed to the base member 70, and a mounting head 72 which maintains the position of an expansion nut N as a part provided on the tip of the driving member 71. The driving mechanism A further has a stocker 73 in which the expansion nuts N which are to be mounted on the base member 70 are temporarily stored in sequence, and a setting member 74 which sets on the mounting head 72 the expansion nuts N within the stocker 73. The driving mechanism A, as shown in phantom lines in FIG. 12, is first, corresponding to the teaching action of the robot R1, located close to a parts feeder 75, and receives expansion nuts N through a chute 76 and places them in the inside of the stocker 73. Following this, the driving mechanism A, as indicated in solid lines in FIG. 12, corresponding to the teaching action of the robot R1, is transported to a prescribed location. Then the expansion nuts N in the stocker 73 are set in the mounting head 72 through the setting member 74. After this, the expansion nuts N are driven and set by the driving member 71 in a mounting hole 77 of the instrument panel I which has been positioned in the prescribed angled location. Further, as shown in FIG. 13, a positioning-coupling mechanism 78 is provided to position the stocker 73 and the chute 76 in alignment.

Accordingly, when all the parts or components are assembled in the instrument panel I, utilizing this parts assembly mechanism, it is effective to secure the instrument panels in the securing jigs F, respectively, before successively transporting the instrument panels I secured in the securing jigs F on the transport mechanism H. In this case, the instrument panel I is positioned in the frame 30 of the securing jig F by means of the positioning leaves 37 and of the engagement between the positioning hole and a positioning protrusion (not shown), and is reliably secured in the frame 30 by means of the clamper 32. Accordingly, the instrument panel I is transported to the transport mechanism H in an intergrated manner along with the securing jig F.

Figure 14A:
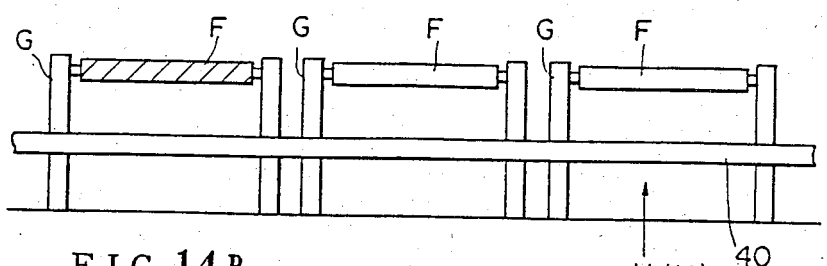
FIG. 14A to FIG. 14G are schematic views showing the mutual relationships among the transportation device, the securing jig and the setting jig.
Figure 14B:
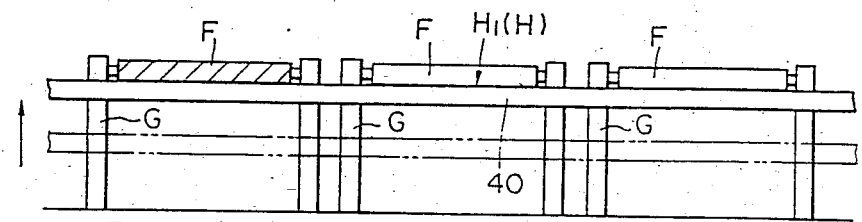
Figure 14C:
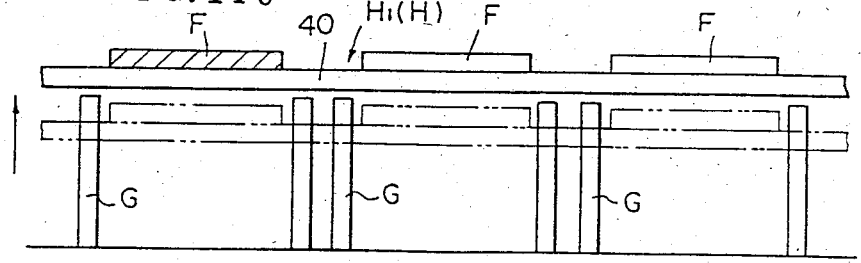
Figure 14D:
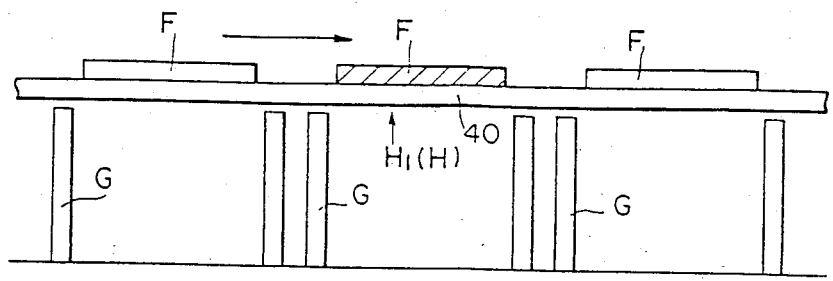
Figure 14E:
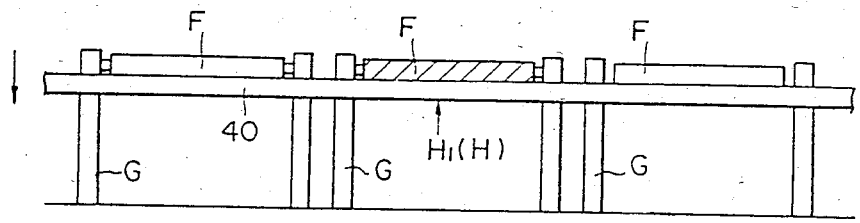
Figure 14F:
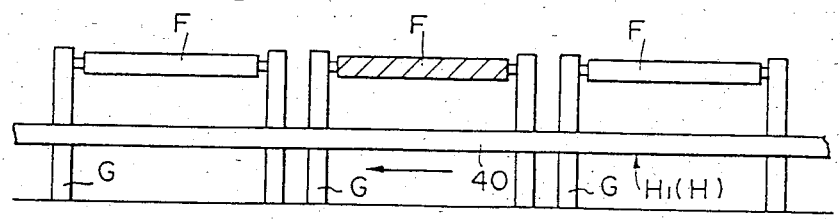

In this status, the instrument panel I, as shown in FIG. 3, is transported to each parts assembly stage S1 to S13 insequence by the transport mechanism H, and is loaded onto the setting jig G at each of the parts assembly stages. That is, the fixtures 41 of the shuttle bars 40 which form the transport mechanism H, engage with the matching holes 42a and 42b on the frames 30 of the securing jig F, as shown in FIG. 4. For this reason, the instrument panel I which is placed on a pedestal (not shown) or on the setting jig G, as shown in FIG. 14A to FIG. 14C, is raised up when the shuttle bars 40 are up, due to the engagement between the fixture 41 and the securing jig F. The instrument panel I, as shown in FIG. 14D and FIG. 14E, after being transported to the next stage by the forward movement of the shuttle bar 40, is placed onto the pedestal or the setting jig G on that stage when the shuttle bar 40 descends, releasing the engagement between the fixture 41 and the securing jig F. Then the shuttle bar 40, which had descended, moves backward and returns to its original position as shown in FIG. 14F.

At that time, in the instrument panel I which is placed onto the setting jig G, the securing jig F is positioned according to the engagement of the positioning hole 58 of the securing jig F and the positioning pin 58 of the setting jig G, and is supported on the bearing plate 57 of the setting jig G. For this reason, the instrument panel I is positioned in the setting jig G. In this case, the securing jig F becomes separated from the setting jig G in the upward direction. However, by means of instructions from a control mechanism (not shown), the positioning shaft 61 of the setting jig G protrudes forward, and engages with the positioning hole 67 in a protruding leaf 66 of securing jig F, the securing jig F becomes fixed in a reliable manner to the setting jig G. The instrument panel I is secured to the setting jig G through this securing jig F.

Figure 14G:
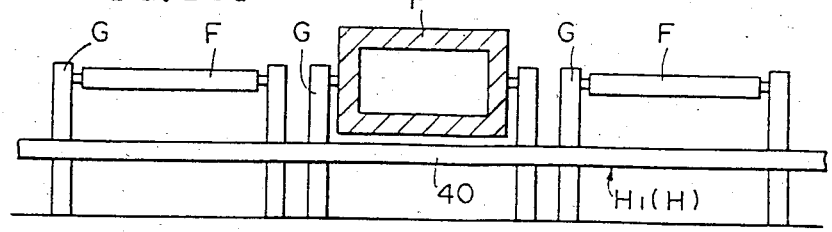

After this, the pulse motor 55 of the setting jig G based on an instruction signal from a control mechanism (not shown), pivots by a fixed angle only, and accompanying this action, as shown in FIG. 4 and FIG. 14G, the securing jig F is made to pivot to a prescribed fixed angle around the postioning shaft 61 as center. For this reason, the instrument panel I is set in an attitude at a prescribed angle. In this case, the attitude of the instrument panel I is set so that the mounting portions for the parts face in an upward direction in the assembling stages S1 to S13. In this status, the parts assembly robots R1 to R13 at the assembling stages S1 to S13 mount sequentially the respective parts from above, according to a specified teaching action, down to the mounting portions of the respective instrument panels I maintained in a specific angular attitude.

Figure 15A:
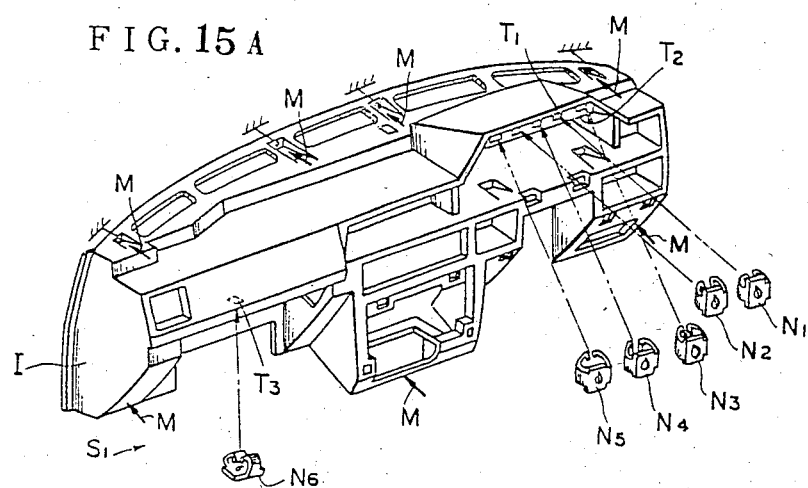
Figure 15B:
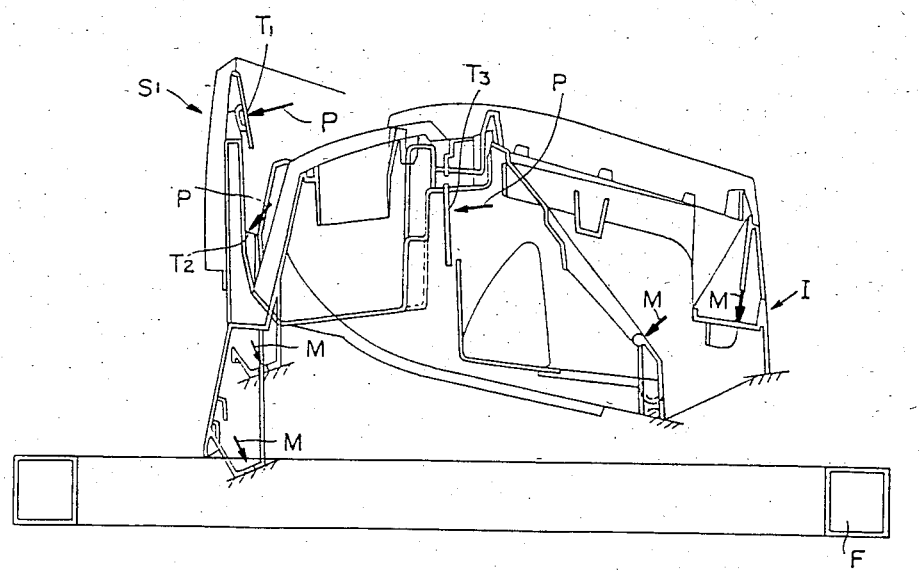
Figure 16A:
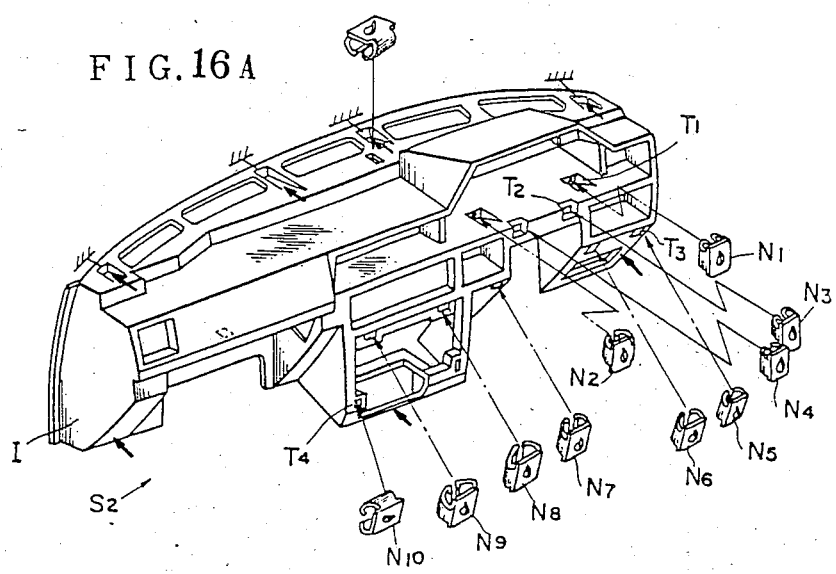
Figure 16B:
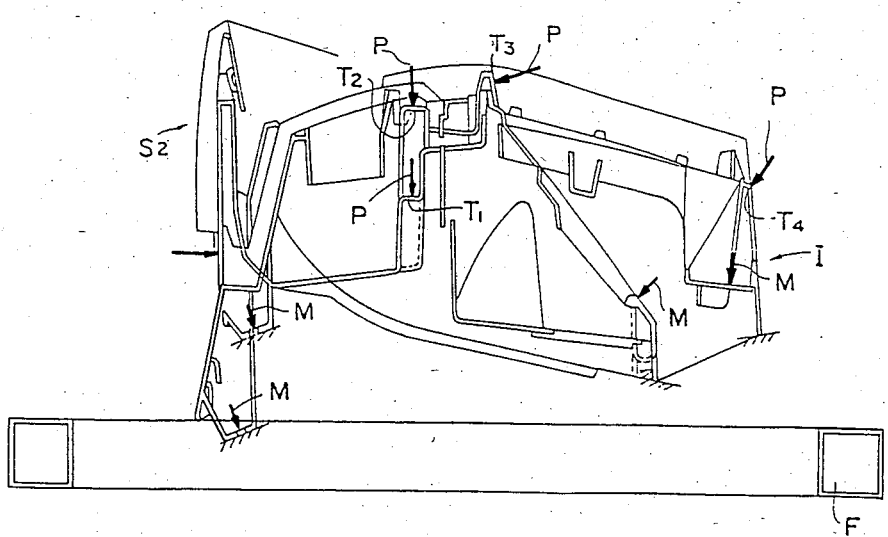
Figure 17A:
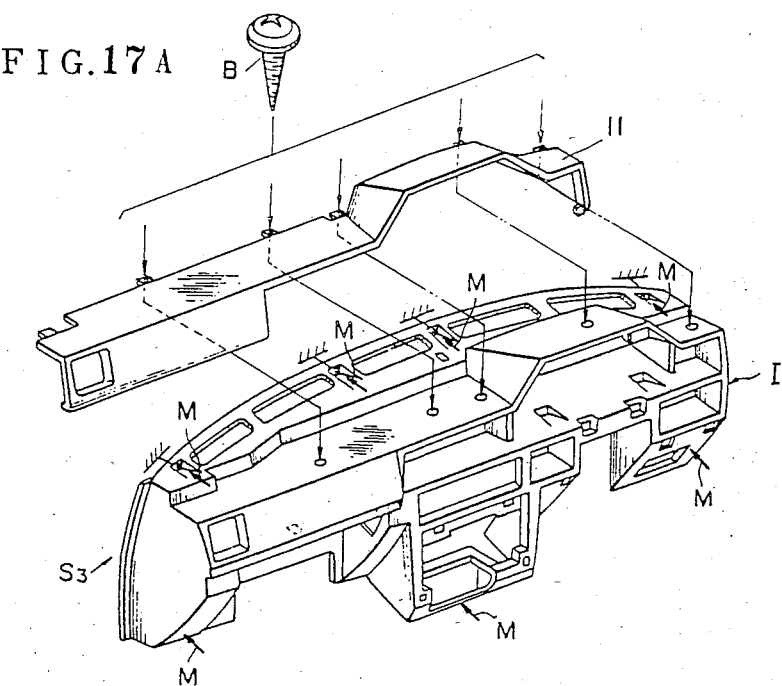
Figure 17B:
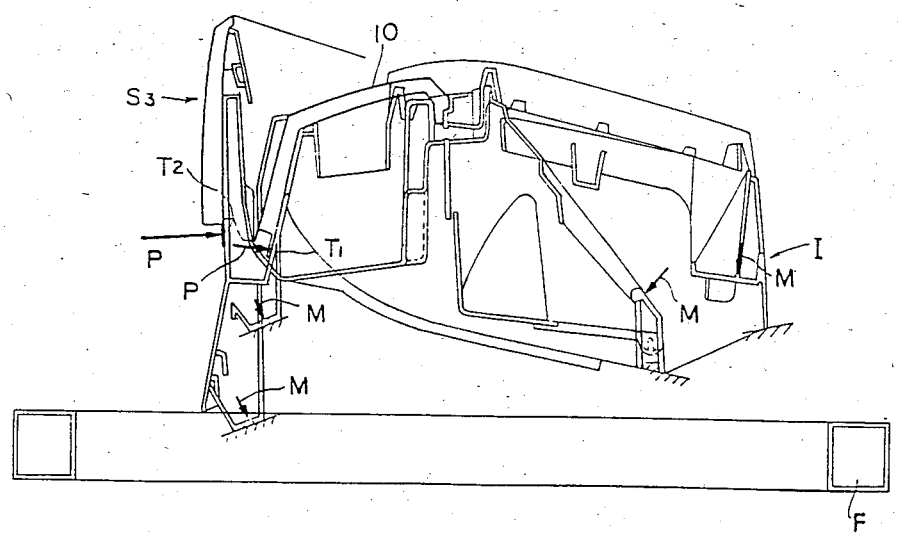
Figure 18A:
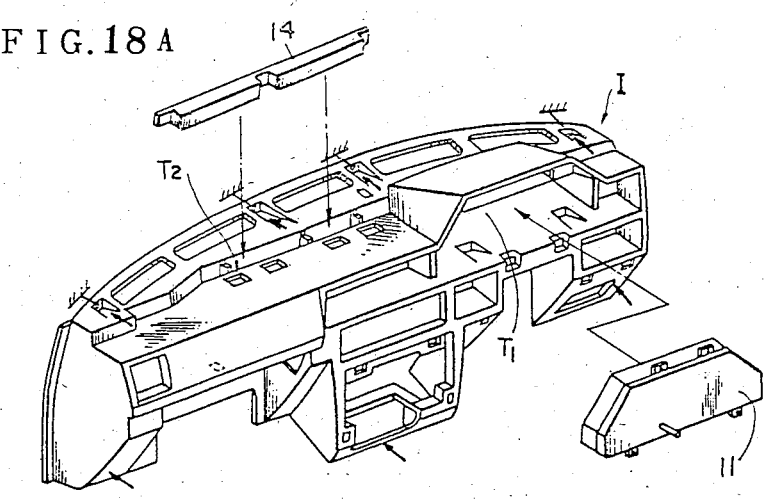
Figure 18B:
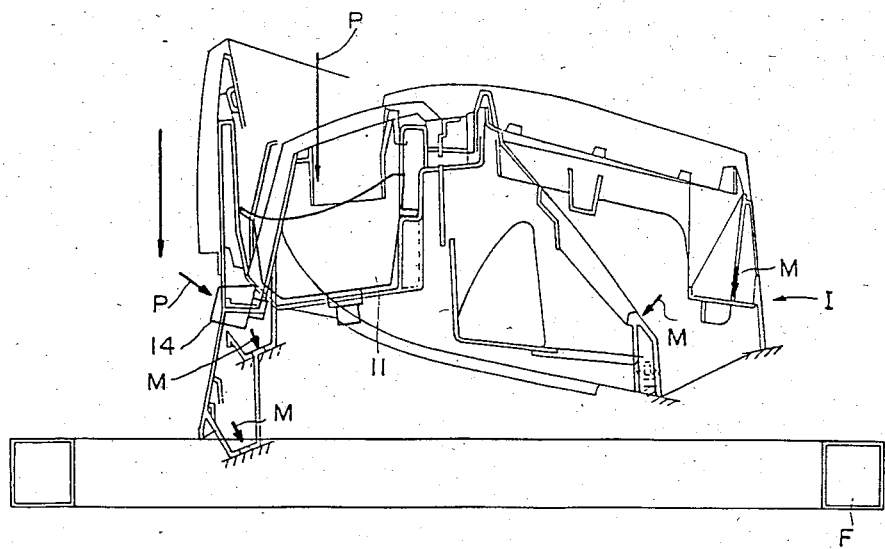
Figure 19A:
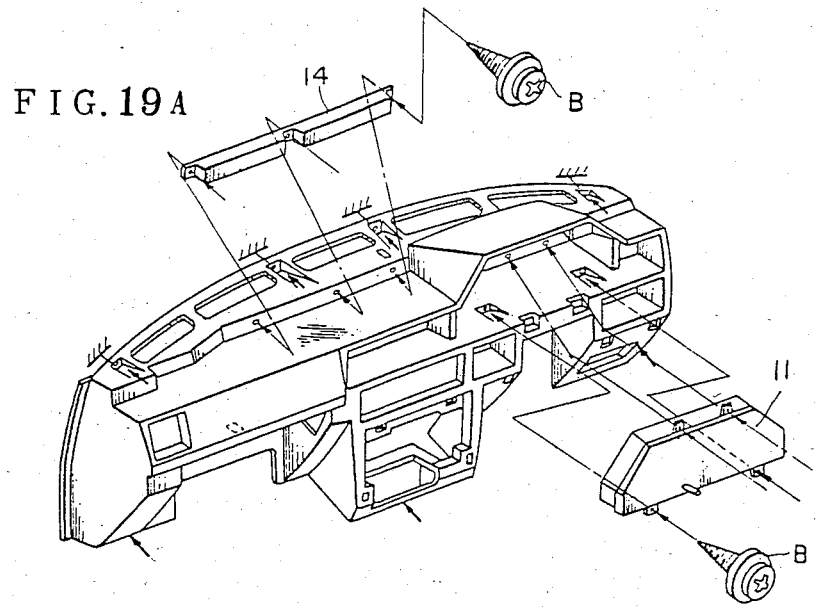
Figure 19B:
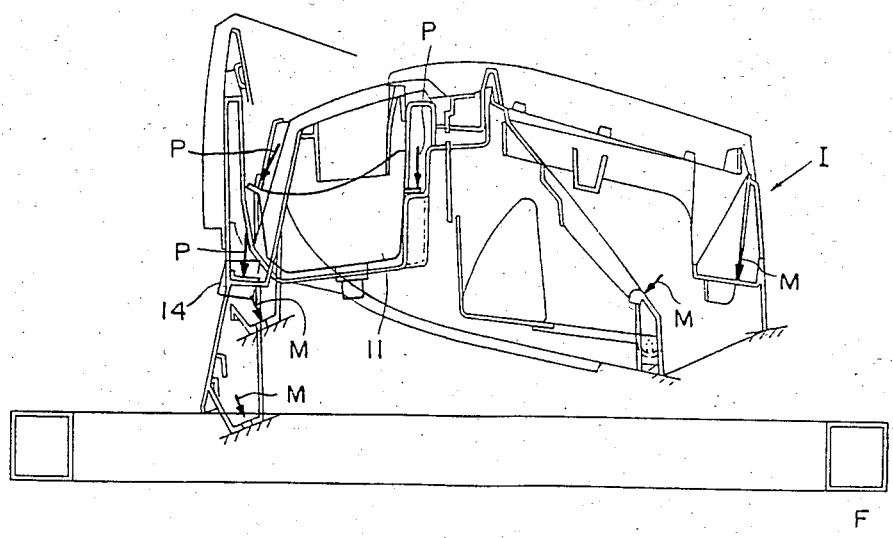
Figure 20A:
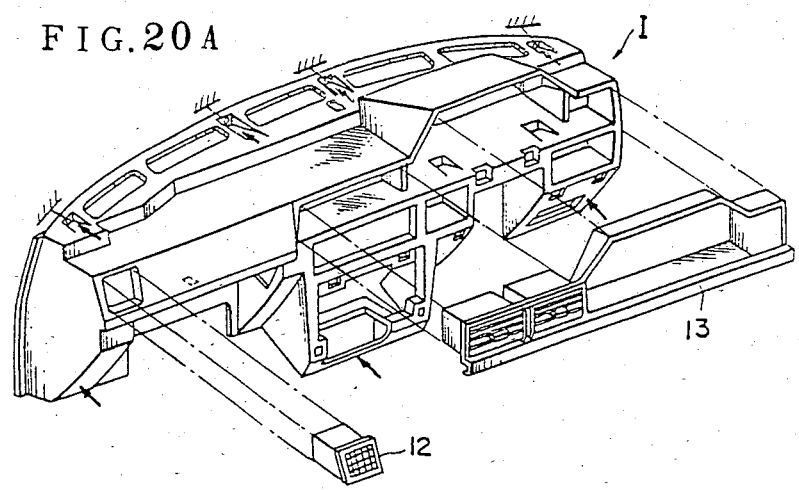
Figure 20B:
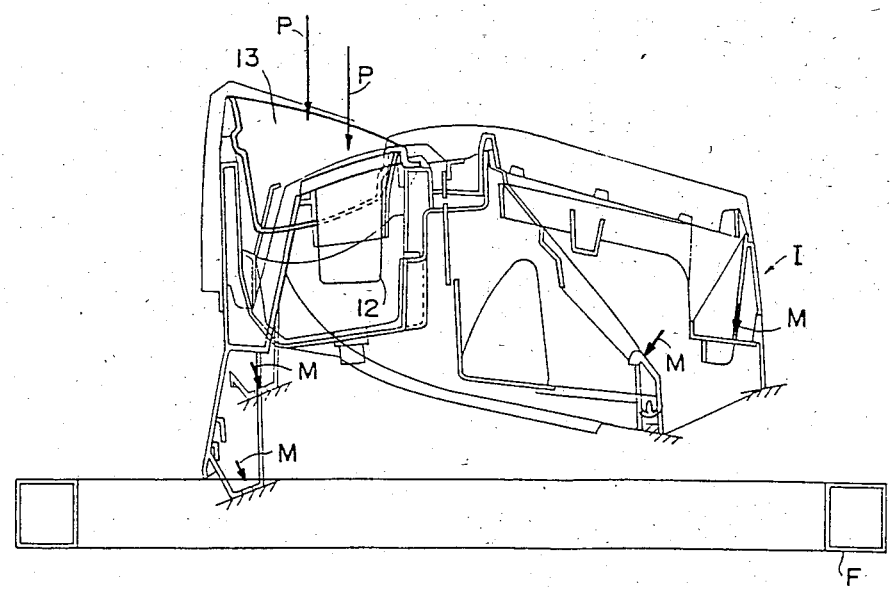
Figure 21A:
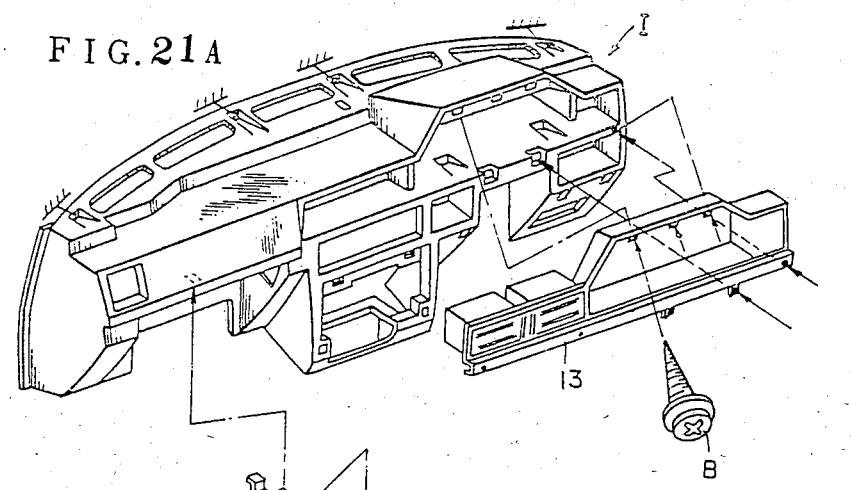
Figure 21B:
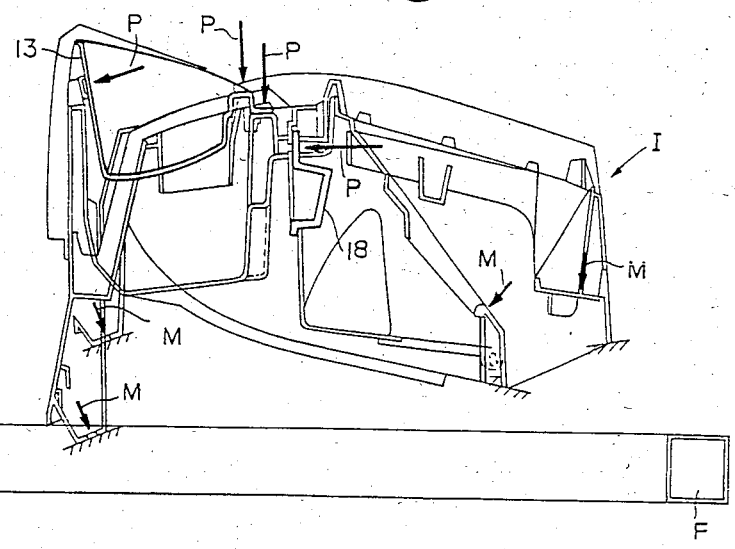
Figure 22A:
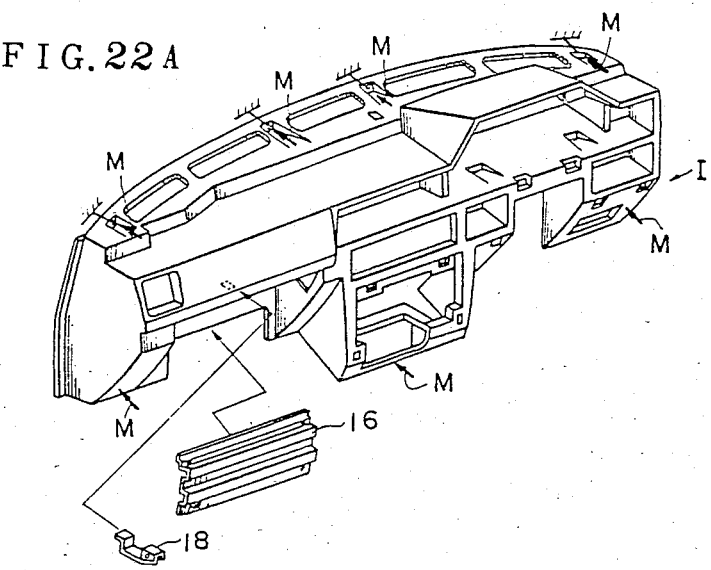
Figure 22B:
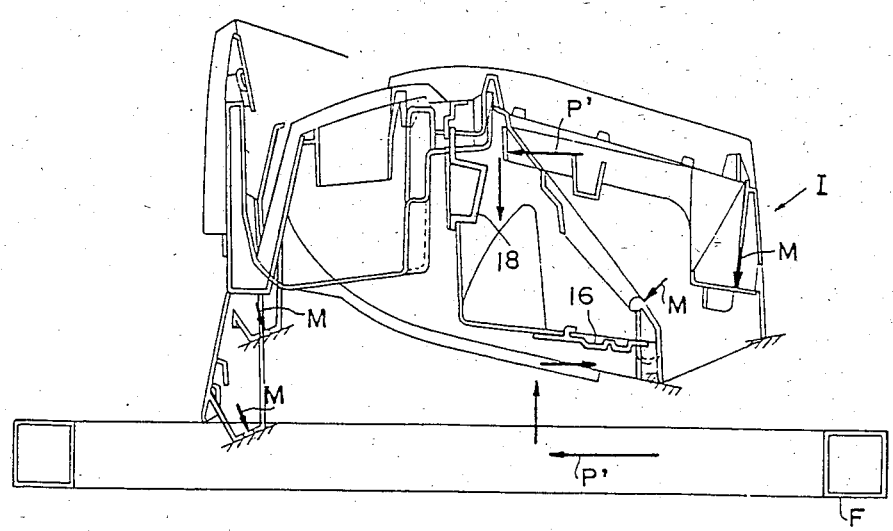
Figure 23A:
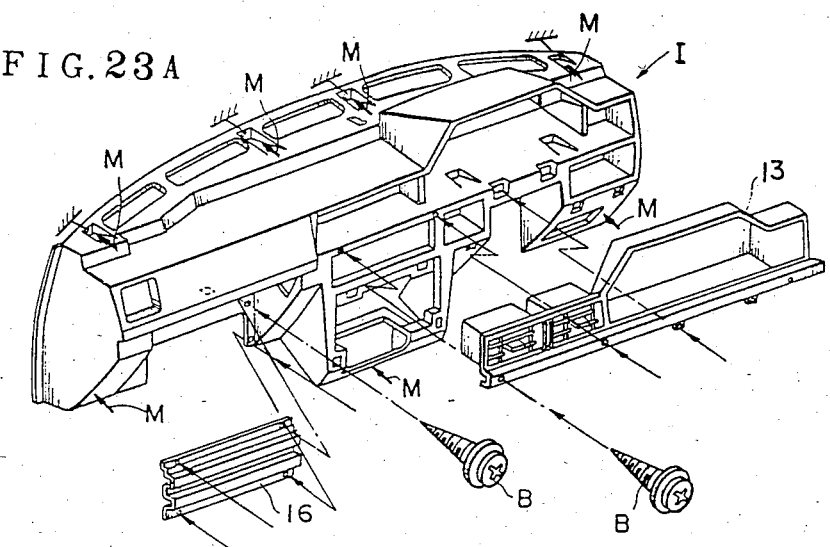
Figure 23B:
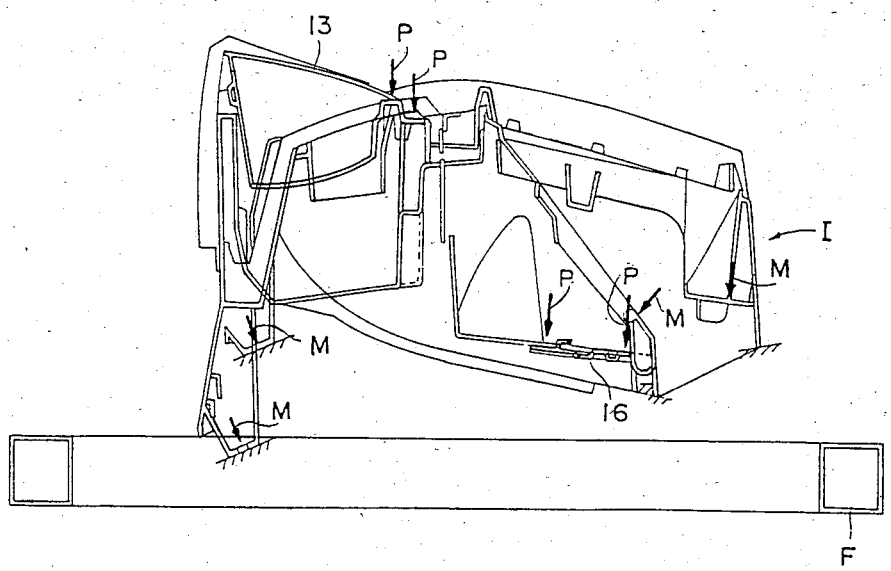
Figure 24A:
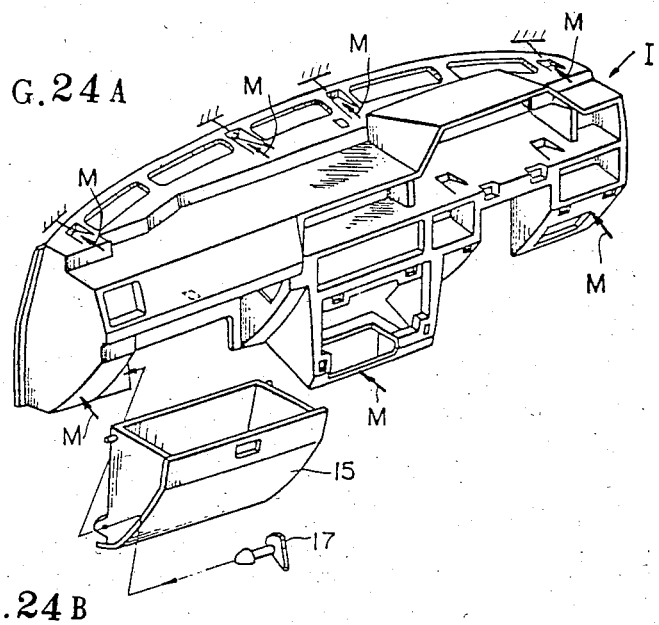
Figure 24B:
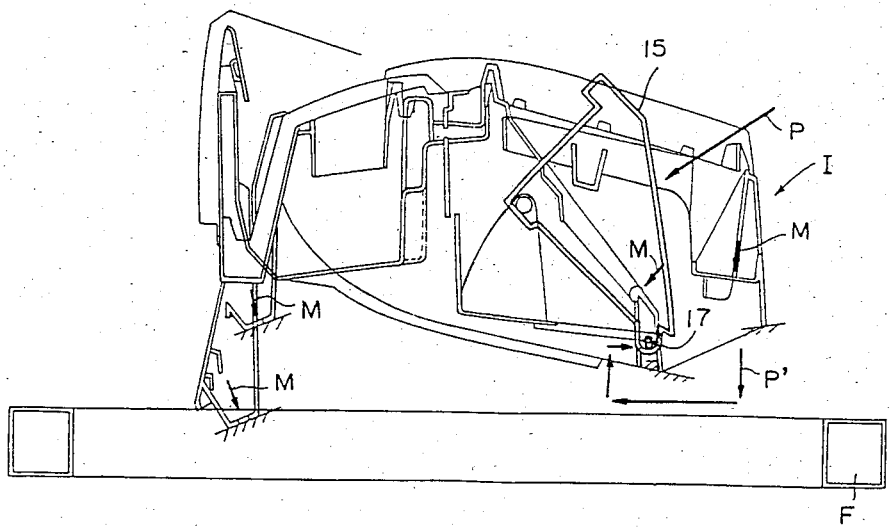

To explain this further in more detail, at the first assembly stage S1, as shown in FIG. 15A and FIG. 15B, the expansion nuts N1 to N6 for the combination meter 11, the first cluster lid 13 and the glove box striker 19 are mounted on the mounting portions T1, T2, and T3 of the instrument panel I. In this case, the driving direction P of the expansion nuts N1 to N6 by means of the parts assembly robot R1 is fixed, while the instrument panel I is positioned in sequence, by means of the setting jig G, in specified angular attitudes. For this reason, the mounting portions T1, T2, and T3 of the instrument panel I are placed in a position opposing the driving direction P of the expansion nuts N1 to N6. Furthermore, in the drawing, the arrow M shows the clamp position of the instrument panel I in the securing jig F. In addition, at the second assembly stage S2, as shown in FIG. 16A and FIG. 16B, the expansion nuts N1 to N10 used for the combination meter 11, the first cluster lid 13 and the second cluster lid 21 are mounted from the fixed driving direction P on the mounting positions T1, T2, and T3 of the instrument panel I which is set in specific angular attitudes. Also, at the third assembly stage S3, as shown in FIG. 17A and FIG. 17B, the instrument pad 10 temporarily mounted at the manual line is tightened with screws B, while the instrument panel I is set at specific angular attitudes. The parts assembly robot R3 screws in the screws B in sequence from the fixed direction P. Subsequently, the respective parts assembly operations are carried out in the assembly stages S3 to S13. Further, in FIG. 18A and FIG. 18B the temporary assembly of the combination meter 11 and the instrument lamp 14 is shown, while in FIG. 19A and FIG. 19B the portions to be secured by the screws B are shown. FIG. 20A and FIG. 20B show the temporary assembly of the cluster lid 13 and the side ventilator 12, while FIG. 21A and FIG. 21B show the portions to be secured by the screws B. FIG. 22A and FIG. 22B show the temporary assembly of the reinforcing member 16 of the glove box 15, and of the striker 18, while FIG. 23 shows the portions to be secured by the screw B. FIG. 24A and FIG. 24B show the mounting of the glove box 15 and its hinge pin 17. In this case, the reinforcing member 16 of the glove box 15, the hinge pin 17, and the striker 18 are assembled in the instrument panel I from the direction shown by the arrow P' with reference to the mounting position, but the other parts are assembled in the instrument panel I from the fixed direction P. Then, on completion of the parts assembly at all the stages, the instrument panel I positioned in one assembly stage, by means of the setting jig G, returns to the attitude at transportation time. Subsequently the instrument panel I is transported to the next stage by means of the shuttle bars 40 used for the transportation mechanism H, and passes through all the assembly stages. All the parts are now assembled on the instrument panel I, which provides a fully constructed instrument.

In the above embodiment of the present invention, the securing jig F is provided with a rectangular frame 30, but the present invention is not restricted to such a configuration, and so long as the instrument panel I can be fixed, any appropriate design change may be carried out. In addition, the setting jig G turns the instrument panel I and sets it in a prescribed angular attitude, but the present invention is not restricted to such a configuration, and the instrument panel I may be swung into and set in the prescribed attitude. Furthermore, in this embodiment of the present invention, the instrument panel I is given as an example of a structure member for assembly, but the present invention is by no means restricted to such an instrument panel, and any appropriate member can of course be selected. In this embodiment of the present invention, the parts are assembled in the vertical direction, but the present invention is by no means restricted to this direction.

Various modifications will become possible for those skilled in the art after receiving the teachings of the present disclosure without departing from the scope thereof.

What is claimed is:

1. An automatic assembly apparatus for assembling parts or components in a structure member, said apparatus comprising a securing jig means for removably supporting said structure member, a transportation means for transporting said structure member supported by said securing jig means to and from at least one assembly stage, a setting jig means Provided on said at least one assembling stage for positioning said securing jig means with said structure member supported therein, and an automatic device provided on said at least one assembling stage for mounting said parts or components from a predetermined direction to said structure member;
   wherein said securing jig means comprises a rectangular frame surrounding said structure member, a plurality of retaining means mounted to said frame for supporting said structure member, and a positioning means for positioning said structure member in said frame.

2. The automatic assembly apparatus of claim 1, wherein said retaining means comprises a clamper means comprising a support plate, a mounting base provided on said support plate, an operating lever rotatably supported on said mounting base, a pivoting arm pivotally supported on said mounting base and joined through toggles to said operating lever, and a press means mounted to said pivoting arm at the tip portion thereof to retain said structure member between said support plate and said press means.

3. The automatic assembly apparatus of claim 1, wherein said positioning means comprises a plurality of positioning holes each provided through said frame for receiving a positioning projection of said structure member, and a plurality of leaf and guide means for bearing and positioning said structure member.

4. The automatic assembly apparatus of claim 3, wherein said positioning holes are provided in the longitudinal members of said frame while said leaf and guide members are provided in the transverse members of said frame.

5. The automatic assembly apparatus of claim 1 wherein said structure member is an instrument panel for an automobile.

6. The automatic assembly apparatus of claim 1, wherein said automatic device is a robot of simple construction for mounting parts or components to said structure member through simple linear movement.

7. The automatic assembly apparatus of claim 1, used for a production line comprising a plurality of assembling stages.

8. The automatic assembly apparatus of claim 1, wherein said transportation device means comprises a lift and carry type conveyor comprising a pair of shuttle bars to carry and lift said securing jig and structure member assembly to said setting jig means.

9. An automatic assembly apparatus for assembling parts or components in a structure member said apparatus comprising a securing jig means for removably supporting said structure member, a transportation means for transporting said structure member supported by said securing jig means to and from at least one assembly stage, a setting jig means provided on said at least one assembling stage for positioning said securing jig means with said structure member supported therein, and an automatic device provided on said at least one assembling stage for mounting said parts or components from a predetermined direction to said structure member;
   wherein said setting jig means comprises a pair of vertical supporting struts each extending from a stand on said assembly stage and a mechansim supported by said strut for rotatably supporting said structure member so as to direct each of the mounting portions of said structure member in the direction to insert the part or component thereinto.

10. The automatic assembly apparatus of claim 9, wherein said mechanism comprises a rotating member provided in a casing supported by said strut and adapted to turn with said structure member and securing jig means assembly, a pulse motor for rotating said rotating member, a bearing plate mounted to said rotating member for supporting said securing jig means and a movable positioning shaft extending through said rotating member and reciprocally moved by a piston cylinder means so as to support at its advanced position said securing jig means.

11. The automatic assembly apparatus of claim 10, wherein said supporting of said securing jig is made by engagement between a first positioning hole provided in a frame of said securing jig and a pin of said bearing plate and between a second positioning hole provided in said frame and said positioning shaft.

12. A parts assembly method for automatically assembling parts of components in a structure member, said method comprising the steps of:
   securing said structure member on a securing jig,
   transporting said securing jig to an assembling stage,
   rotating said securing jig to a prescribed angular position,
   mounting said parts or components onto said structure member from a prescribed fixed direction,
   rotating said securing jig to an original position, and
   removing said securing jig from said assembling stage;
   wherein said structure member is positioned in a frame of said securing jig through engagement between positioning means provided on said frame and said structure member and, further retained in place by a retaining means mounted to said frame and comprising a press means and a bearing plate to retain said structure member therebetween.

13. The parts assembly method of claim 12, wherein said parts or components are mounted onto said structure member by a robot which provides linear movements to mount said parts or components to said structure member.

14. The parts assembly method of claim 13, wherein said robot mounts said parts or components from above in the vertical direction down to said structure member.

15. The parts assembly method of claim 12, applied to a production line including a plurality of assembly stages wherein at least one robot is used at one stage for assembly, and the assembly of all of said parts or components onto said structure member is completed throughout said production line.

16. A parts assembly method for automatically assembling parts of components in a structure member, said method comprising the steps of:
   securing said structure member on a securing jig,
   transporting said securing jig to an assembling stage,
   rotating said securing jig to a prescribed angular position, mounting said parts or components onto said structure member from a prescribed fixed direction, rotating said securing jig to an original position, and removing said securing jig from said assembling stage;

wherein said securing jig with said structure member supported therein is rotated through a setting jig provided in said assembly stage.

17. The parts assembly method of claim 16, wherein said securing jig is supported by said setting jig through engagement between holes provided in said securing jig and a pin and shaft means of said securing jig and said shaft being reciprocally movable to engage with and disengage from said securing jig.

* * * * *